United States Patent [19]

MacRander

[11] 3,749,856

[45] July 31, 1973

[54] AMPLIFYING JUNCTOR CIRCUIT

[75] Inventor: Max S. MacRander, Warrenville, Ill.

[73] Assignee: GTE Automatic Electric Laboratories Incorporated, Northlake, Ill.

[22] Filed: Nov. 22, 1971

[21] Appl. No.: 200,671

[52] U.S. Cl. .......... 179/170 G

[51] Int. Cl. .......... H04b 3/36, H04b 3/16

[58] Field of Search .......... 179/170 G, 170 T, 179/170 R, 18 GF, 18 GE; 330/12, 26, 28; 333/80 T

[56] References Cited

UNITED STATES PATENTS

| | | | |
|---|---|---|---|
| 3,439,120 | 4/1969 | Levine | 179/170 G |
| 3,042,759 | 7/1962 | Bonner | 179/170 G |
| 3,562,561 | 2/1971 | Klosterman | 333/80 T |

*Primary Examiner*—Kathleen H. Claffy
*Assistant Examiner*—Alan Faber
*Attorney*—K. Mullerheim, R. F. Van Epps et al.

[57] ABSTRACT

A junctor circuit for providing the d.c. bias current for a crosspoint network and the a.c. interconnection from the subscriber loop of a telephone system is provided with a negative impedance network to introduce bilateral gain.

7 Claims, 1 Drawing Figure

PATENTED JUL 31 1973 3,749,856
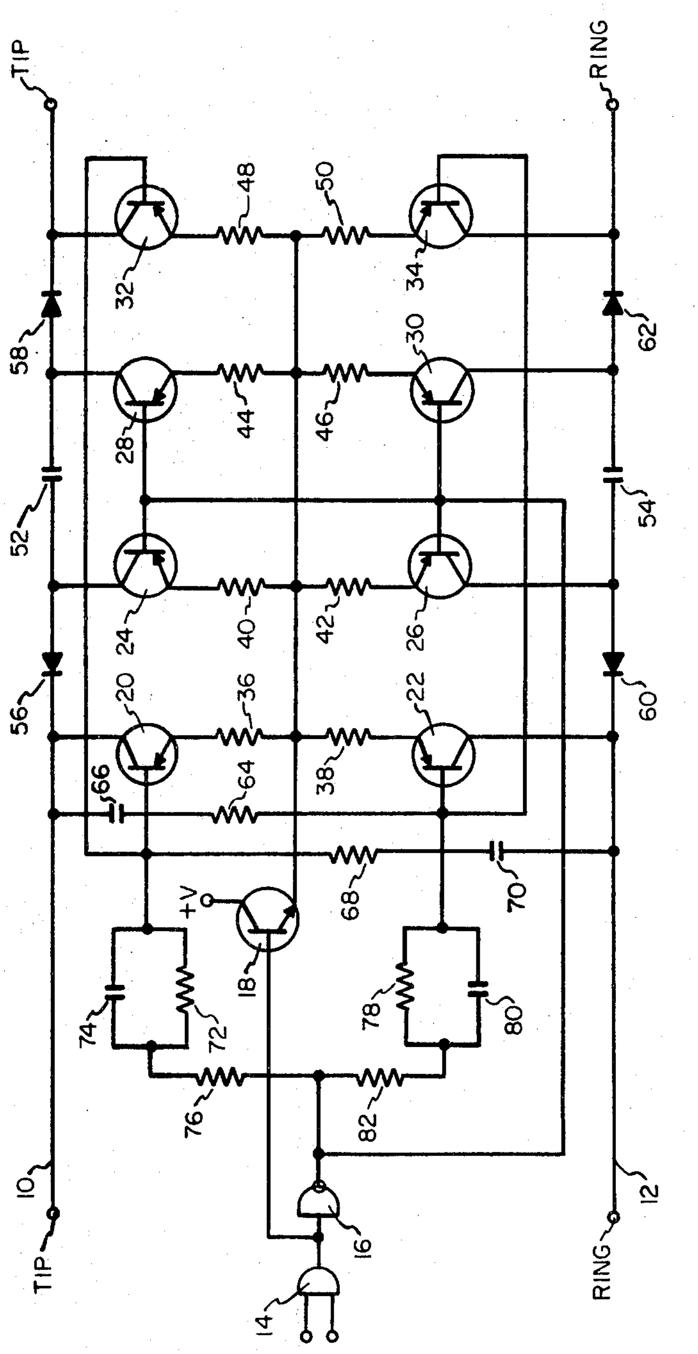
INVENTOR
MAX S. MACRANDER
BY
ATTORNEY

AMPLIFYING JUNCTOR CIRCUIT

BACKGROUND OF THE INVENTION

1. Field of the Invention

The present invention relates generally to the field of telephony and more particularly to a new and improved junctor circuit having bilateral gain.

2. Description of the Prior Art

As the mechanical switches heretofore generally used in telephone systems are replaced by semiconductor switching components the relatively higher a.c. resistance of the switching system will result in an increase in transmission losses. Since the a.c. resistance of semiconductor switching elements is typically in the 5–10 ohm range and the required d.c. separation transformer further adds to the resistance, overall network transmission losses may vary from 1 to 3 db. In cases where it is necessary to cascade several telephone exchanges, losses in a given network must be held to less than 1 db in order that signal attenuation over the complete path be maintained at acceptable levels. To accomplish this it is necessary to introduce gain to compensate for transmission losses in the semi-conductor switching system. Since the junctor is the point of maximum network concentration it is advantageous to introduce gain in the junctor circuit. Since bilateral gain is required, a negative impedance arrangement in the junctor circuit offers the most economical solution to the problem.

A negative impedance circuit of the series type, opencircuit stable variety is described in an article entitled "Electronic Switching Network of IBM 2750" by R. E. Reynier published in the July 1969 issue of IBM Journal of Research and Development. The problem with the application of this approach to junctor circuits for semiconductor switching systems lies in the relatively complex circuitry required; i.e., at least four extra active transistors are required for each junctor. An alternative approach is the use of a shunt-type, short-circuit stable negative impedance. It is, however, necessary with this type of circuit to take precautionary measures to avoid instability during high impedance conditions which exist, for example, when one telephone is off hook.

OBJECTS AND SUMMARY OF THE INVENTION

From the foregoing discussion it will be understood that among the various objectives of the present invention are:

to provide a new and novel junctor circuit for semiconductor switching networks;

to provide apparatus of the above-described character which exhibits bilateral gain; and to provide apparatus of the above-described character having a negative impedance shunting the line connection through the junctor.

These and other objectives of the present invention are efficiently met by providing a junctor circuit with a resistive coupling to produce voltage feedback from tip to ring as well as ring to tip leads thereby producing bilateral gain in the improved junctor circuit. The addition of an RC circuit may also provide compensation for low frequency transformer roll off.

The preceding as well as other objects, features and advantages of the present invention will become more apparent from the following detailed description taken in conjunction with the appended drawing.

BRIEF DESCRIPTION OF THE DRAWING

The single appended FIGURE is a schematic diagram of an amplifying junctor circuit constructed in accordance with the principles of the present invention.

DESCRIPTION OF PREFERRED EMBODIMENT

The junctor circuit of the present invention is coupled across the tip and ring lines, 10 and 12 respectively, of a conventional balanced switching network. Likewise in conventional manner, input signals from the switching logic (not shown) are applied to the junctor through AND gate 14 to the base of transistor 18. In its conducting state transistor 18 couples a positive voltage, +V, (typically between 3 and 5 volts) in parallel to the current driving transistors 20–34 via resistors 36–50 respectively. Capacitors 52 and 54 in the tip 10 and ring 12 leads respectively provide d.c. separation and a.c. coupling. Diodes 56—62 operate to limit the amplitude of negative going transients via the d.c. separation capacitors 52 and 54 between both d.c. paths to values determined by the current settings of current driving transistors 24, 28, 26 and 30.

In accordance with this invention a resistor 64 is coupled to the tip lead 10 and via capacitor 66 in parallel to the bases of current driving transistors 22 and 34. In a similar fashion a resistor 68 is coupled from ring lead 12 via capacitor 70 to the bases of current driving transistors 20 and 32. Resistors 64 and 68 provide a voltage feedback path from tip to ring and vice versa. This effectively creates a negative impedance shunting the connection and thus provides the desired bilateral gain.

In order that the shunt connection may be prevented from being sustained by the binary "1" output level of gate 14 after the junctor is reset capacitors 66 and 70 are coupled in series with the feedback resistors 64 and 68 respectively.

A parallel circuit comprising resistor 72 and capacitor 74 may be coupled via resistor 76 from the output of inverter 16 in parallel to the bases of current driving transistors 20 and 32 to provide extra gain at the lower frequencies to compensate for low frequency transformer roll-off if desired. In the same manner a like parallel circuit comprising resistor 78 and capacitor 80 may be coupled via resistor 82 from the output of inverter 16 to the bases of current driving transistors 22 and 34 for the same purpose.

It will be seen that, assuming transistors having 100% transport efficiencies and that resistor pairs 64 and 68, 72 and 78, and 76 and 82 each have substantially the same values respectively, the a.c. impedance of the illustrated circuit at low (i.e., less than 600 Hz) frequencies is:

$$Z_l \approx [-2R_{36}\ (R_{64} + R_{72} + R_{76})]/(R_{72} + R_{76} - R_{36}) \quad (1)$$

and at higher frequencies (i.e., above 600 Hz) the impedance is:

$$Z_h \approx [-2R_{36}\ (R_{64} + R_{76})]/(R_{76} - R_{36}). \quad (2)$$

The circuit a.c. impedance represents the negative resistance value provided through the use of the feedback connections.

It will further be seen that the circuit is short-circuit stable, in that a short does not result in a voltage being developed across the tip and ring lines 10 and 12, and opencircuit unstable since any voltage produces a current feedback into the infinite impedance of the open circuit which tends to produce a larger voltage.

For the purposes of illustration one embodiment of the present invention was fabricated by the Applicant of components having the following values:

| | |
|---|---|
| resistors **36, 38, 48** and **50** | = 180 ohms; |
| resistors **40, 42, 44** and **46** | = 820 ohms; |
| resistors **64** and **68** | = 5 kilohms |
| resistors **72** and **78** | = 330 ohms |
| resistors **76** and **82** | = 250 ohms |
| capacitors **52** and **54** | = 1.0 microfarad |
| capacitors **74** and **80** | = 8 microfarad |

The circuit so constructed using standard commercial grade transistors and diodes and operated with a six stage crosspoint network had a gain of 1, i.e., transmission through the crosspoint network was substantially lossless and it was observed to produce a negative shunt resistance of approximately −20 kilohms.

The application of the principles of the invention is very efficient in terms of components in that a minimum number are required to produce the desired bilateral gain. It will be noted that this type of negative impedance is unstable under open circuit conditions. In practice this condition will occur during the path establishing procedure when the junctor is activated prior to actual crosspoint turn on. Under this condition, however, the current driving transistors of the circuit illustrated in the Figure are all in a saturated state and no amplifying action is possible.

The most critical condition with respect to junctor gain is the situation where both subscriber phones are on-hook and the connection established, which produce open circuit conditions on both sides of the junctor. This condition arises only momentarily after a call has been completed and both phones are on-hook during any delay in the control circuitry opening the connection. Due to the short duration of the condition and since there is no effect upon the remainder of the switching system no practical problem is presented. Rather the critical practical condition occurs with the path established with one phone off-hook, i.e., the calling subscriber, and the other is on-hook, i.e., the called subscriber. This condition places a limit upon the loss reduction obtainable through the practice of the present invention, however, experiments conducted by the Applicant indicate that transmission losses may readily be reduced to near zero values.

The present invention has been described with respect to use with a balanced crosspoint switching network. It is, however, to be understood that with an unbalanced network configuration the cross feedback principles of the present invention may still be applied to advantage. In such a case, however, the feedback signal may be obtained by means of signal inversion through a transformer or other suitable inversion means in the feedback path. The appended drawing illustrates common control of all current driving transistors 20–34 but it will be apparent that separate control gates and transistor may be provided for current driving transistors 24–30 if desired. With such an arrangement transistors 20, 22, 32 and 34 could be turned on slightly ahead in time of transistors 24–30 in applications wherein such a technique may be used advantageously.

From the foregoing discussion it will be seen that the Applicant has provided a new and novel amplifying junctor circuit whereby the objectives set forth hereinabove are efficiently achieved. Since certain changes in the above-described construction will occur to those skilled in the art without departure from the scope of the invention it is intended that all matter contained in the preceding description or shown in the appended drawing shall be interpreted as illustrative and not in a limiting sense.

Having described what is new and novel and desired to secure by letters patent, what is claimed is:

1. An amplifying junctor circuit for coupling across the tip and ring lines of a balanced switching network, said circuit comprising first, second, third and fourth parallel pairs of current driving transistors, the collectors of the first transistors of each said pair being connected to said tip line, the collectors of the second transistors of each said pair being connected to said ring line, and the emitters of each said pair being coupled together;

means for selectively applying a voltage in parallel to said emitters of each said pair of transistors;

means for coupling the bases of the second transistors of said first and fourth pairs of transistors to said tip line to thereby provide a first feedback path;

means for coupling the bases of the first transistors of said first and fourth pairs of transistors to said ring line to thereby provide a second feedback path;

means including a resistance element for coupling the bases of the transistors of said second and third pairs to the bases of the transistors of said first pair;

said first and second feedback paths providing a negative impedance network shunting said circuit to thereby introduce bilateral gain.

2. Apparatus as recited in claim 1 further including first and second resistors of substantially equal value in said first and second feedback paths respectively.

3. Apparatus as recited in claim 2 further including a capacitance coupled in series with each of said first and second resistors.

4. Apparatus as recited in claim 1 further including a resistor and a capacitance coupled in parallel with one another and in series with said resistance element between the bases of the transistors of said second and third pairs and each of the bases of the transistors of said first pair to thereby increase the gain of said circuit at frequencies below a preselected value.

5. Apparatus as recited in claim 4 wherein the value of said preselected frequency is 600 Hz.

6. Apparatus as recited in claim 1 further including a resistor coupled between each current driving transistor emitter and said voltage applying means.

7. Apparatus as recited in claim 1 wherein said voltage applying means comprises a control logic gate for providing a binary input signal to said circuit;

a source of positive voltage; and a transistor having a collector coupled to said voltage source, an emitter coupled in parallel to the emitters of said current driving transistors, and a base coupled to said control logic gate, said transistor being responsive to said binary input signal to selectively apply said voltage to said current driving transistors.

* * * * *